(No Model.)
J. M. DUNCAN.
EVAPORATING PAN.
No. 460,702. Patented Oct. 6, 1891.
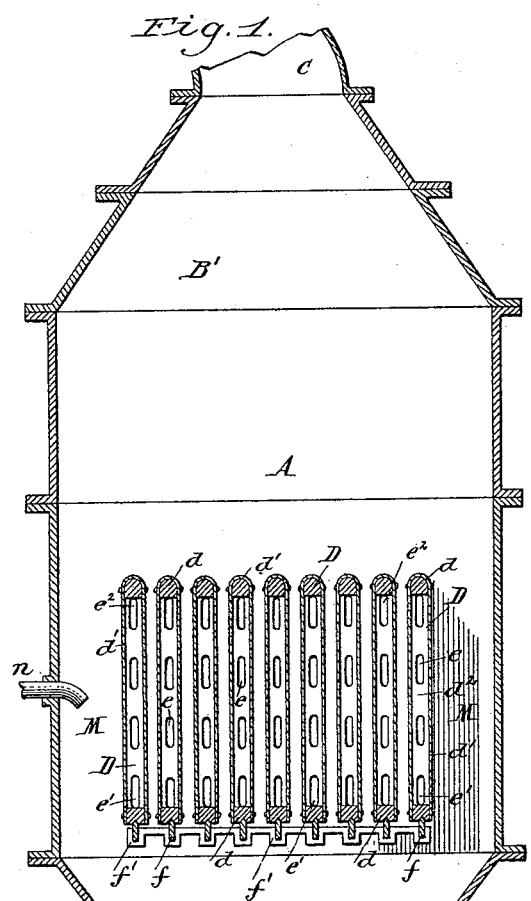
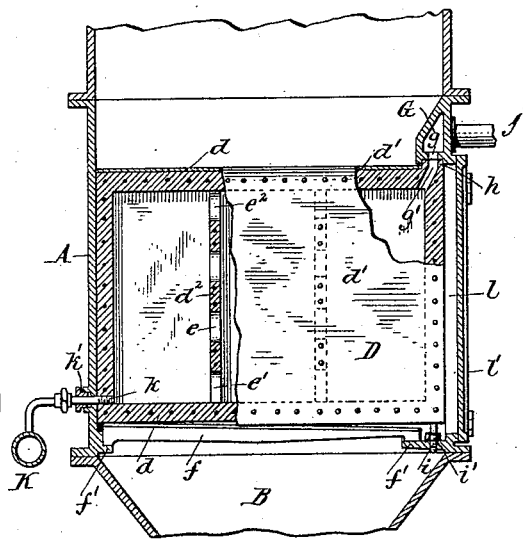
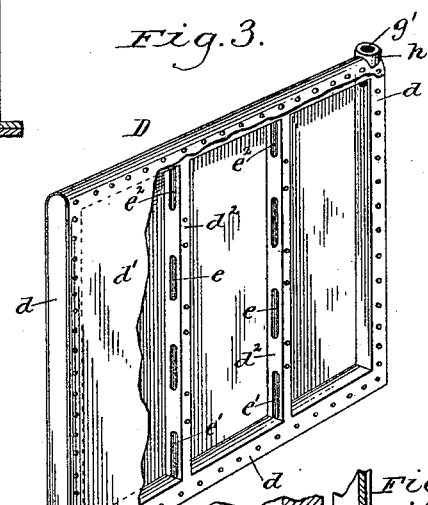
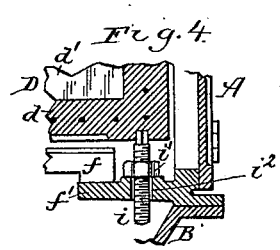
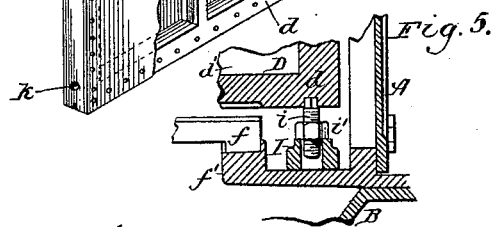
Witnesses: Chas. J. Buchheit, Theo. L. Popp
Joseph M. Duncan, Inventor
By Wilhelm & Bonner, Attorneys

UNITED STATES PATENT OFFICE.

JOSEPH M. DUNCAN, OF SILVER SPRINGS, NEW YORK.

EVAPORATING-PAN.

SPECIFICATION forming part of Letters Patent No. 460,702, dated October 6, 1891.

Application filed March 25, 1889. Serial No. 304,738. (No model.)

*To all whom it may concern:*

Be it known that I, JOSEPH M. DUNCAN, a citizen of the United States, residing at Silver Springs, in the county of Wyoming and State of New York, have invented new and useful Improvements in Evaporating-Pans, of which the following is a specification.

This invention relates to an evaporating-pan used in the manufacture of salt, which is furnished with internal heating-sections removably connected with the pan, so that they can be disconnected and removed from the pan through an opening in the side wall of the latter when required to be cleaned. For a more particular description of this pan reference is made to Letters Patent of the United States No. 396,331, granted to me January 15, 1889. In the pan of my said patent the heating-sections are provided with pipes and the incrustations which are formed envelop these pipes and adhere thereto with considerable tenacity.

One object of my present invention is to reduce the liability of the incrustations adhering to the heating-sections, to facilitate the precipitation of the salt crystals, and to provide for a more unobstructed circulation of the brine through the pan.

Another object of my invention is to improve the devices whereby the sections are raised and lowered.

My invention consists to these ends of the improvements which will be hereinafter more fully described, and pointed out in the claims.

In the accompanying drawings, Figure 1 is a vertical section of an evaporating-pan provided with my improved heating-sections. Fig. 2 is a similar view of the central portion thereof at right angles to Fig. 1. Fig. 3 is a perspective view of one of the heating-sections. Fig. 4 is an enlarged sectional elevation of one of the lifting-screws. Fig. 5 is a similar view showing a modified construction thereof.

Like letters of reference refer to like parts in the several figures.

A represents the central portion of the evaporating-pan, forming the heating-chamber, and which is preferably rectangular in cross-section.

B is the hopper-shaped bottom of the pan, in which the salt crystals settle; B', the tapering top thereof, and C the pipe, whereby the vapors arising from the boiling-brine are conducted to a suitable condenser.

D represents upright flat-sided heating-sections arranged side by side within the heating-chamber of the pan and separated by narrow spaces or passages through which the brine circulates. These heating-sections each consist of a narrow chamber having flat sides and extending across the entire width of the heating-chamber A from front to rear, as shown in Fig. 2. Each section is preferably composed of a rectangular open or skeleton frame $d$, of cast or wrought iron, and side plates $d'$, of sheet metal, preferably copper, secured to the outside of the frame by riveting or otherwise. I prefer to use a single sheet of copper for this purpose, which is bent at its center over the top of the frame $d$, as clearly shown in Figs. 1 and 3. The frames $d$ of the heating-sections are provided between their upright end bars with intermediate upright bars $d^2$, which form supports to which the intermediate portions of the side plates are secured and whereby bending or warping of the plates is prevented. In the intermediate bars $d^2$ are formed slots or elongated openings $e$, whereby the compartments formed between said bars are placed in communication with each other and the steam or other heating agent is allowed to pass from one compartment to the next. The lowermost slot or passage $e'$ in each bar preferably extends to the lower horizontal bar of each frame $d$, as shown, so as to form an unobstructed passage from the first or inlet compartment to the last or discharge compartment of each heating-section, permitting the escape of all the water of condensation which may accumulate in the bottom of the section. The uppermost slot or passage $e^2$ in each intermediate bar extends, preferably, to the top bar of the frame to permit a free escape of the air from each compartment. If desired, however, each heating-section may be constructed of the general form shown in one or more pieces of cast-iron.

The heating-sections D are supported upon horizontal guide-bars $f$, which are seated with their ends in notches or recesses arranged in ledges $f'$, formed on the interior of the front and rear walls of the evaporating-pan, as shown in Figs. 1 and 2. The upper edges of these guide-bars are preferably beveled or made V-shaped and enter similarly-shaped grooves formed in the bottom of the heating-sections. By this construction the several sections are readily guided into place in introducing them into the heating-chamber and are firmly held in position.

G represents a horizontal steam-chamber or supply-manifold arranged within the heating-chamber A and extending across the upper ends of the heating-sections D. In the bottom of the supply-manifold G are arranged openings $g$, which communicate with inlet-openings $g'$ in the adjacent upper ends of the heating-sections. The latter are provided at their inlet-openings with upright nipples $h$, which fit into sockets or depressions formed in the bottom of the supply-manifold, as shown in Fig. 2.

$i$ represents vertical lifting-screws arranged underneath the front ends of the sections for raising and lowering the same. These screws are provided with square or angular heads, which enter correspondingly-shaped sockets in the bottoms of the sections, whereby the screws are prevented from turning. $i'$ represents screw-nuts, which are applied to these screws and which rest upon supports having openings into which the lower portions of the screws project. As represented in Fig. 4, the screw-nuts rest directly upon the ledge $f'$. In the modified construction represented in Fig. 5 the screw-nut rests upon a support I, which in turn rests upon the front ledge $f'$, which supports the front ends of the guide-bars $f$. The upper faces of the latter are inclined forwardly to permit the sections to be lowered sufficiently to disengage the nipples $h$ from the sockets of the supply-manifold. Upon turning the screw-nut by means of a wrench the screw is raised and lowered. By this means the front portions of the sections can be pressed upwardly against the under side of the supply-manifold and tightly held in place, or they can be lowered away from the supply-manifold when required to be removed. When the front end of the section has been lowered to rest upon the guide-bar, the lifting-screw is farther lowered to disengage its head from the socket in the section, and the screw is then removed, either with its support or from its support, preparatory to removing the section.

Steam is supplied to the manifold G by a pipe $j$.

$k$ represents drip-pipes entering the lower ends of the heating-sections diagonaly opposite the inlet-openings $g'$, and whereby the water of condensation is discharged from the sections. These drip-pipes pass outwardly through stuffing-boxes $k'$, arranged in the rear wall of the evaporating-pan, and are all connected with a main drip-pipe K. The latter is connected with a steam-trap or other receptacle, to which the water of condensation is to be conducted. The drip-pipes $k$ are screw-threaded at their inner ends and fit in screw-threaded openings in the heating-sections, so that the drip-pipes can be readily unscrewed from the sections when it is desired to remove the latter from the pan.

The front wall of the pan is provided with an opening $l$, which is closed by a door $l'$, and through which the heating-sections are introduced and removed.

The series of heating-sections preferably do not extend to the side walls of the pans, but are separated therefrom by upright spaces M M, which form descending circulating-passages on the outer sides of the nest of sections. The brine is delivered into the evaporating-pan by a pipe $n$, entering one of these circulating-passages. The brine flows upwardly through the spaces between the heating-sections and downwardly through the outer descending passages. The sides of the heating-sections being flat and unbroken, they offer no obstruction to the circulating brine and afford no ledges on which the incrustations or salt crystals are liable to lodge, thus insuring a more uniform heating and a more rapid evaporation of the brine and lessening the tendency of incrustations and salt crystals to adhere to the sections.

As the heating-sections present, essentially, but two flat smooth surfaces, they are conveniently and quickly cleaned from such incrustations as are deposited thereon. This is an important feature in the use of these pans, as it is desirable to shorten the time during which the operation of the plant is suspended as much as possible.

When it is desired to free the heating-sections from incrustations, they are readily removed from the pan by loosening the set-screws $i$, unscrewing the drip-pipes $k$ from the sections, and then sliding the sections outwardly upon the guide-bars through the opening $l$.

I claim as my invention—

1. A hollow flat-sided heating-section composed of an open rectangular frame and flat plates applied to the sides of said frame, substantially as set forth.

2. A hollow flat-sided heating-section composed of an open rectangular frame $d$, having intermediate bars $d^2$, provided with slots or passages, and flat plates $d'$, applied to opposite sides of said frame, substantially as set forth.

3. A hollow flat-sided heating-section composed of an open frame and a single sheet of metal bent around one of the bars of the frame and secured to both sides of the latter, substantially as set forth.

Witness my hand this 18th day of March, 1889.

JOSEPH M. DUNCAN.

Witnesses:
JNO. J. BONNER,
FRED. C. GEYER.